March 13, 1945.  A. Y. DODGE  2,371,228
TORQUE TRANSMISSION
Filed Feb. 17, 1943   2 Sheets-Sheet 1

Inventor:
Adiel Y. Dodge,
By Dawson, Ooms and Booth.
Attorneys.

March 13, 1945.  A. Y. DODGE  2,371,228
TORQUE TRANSMISSION
Filed Feb. 17, 1943  2 Sheets-Sheet 2

Inventor:
Adiel Y. Dodge,
By Dawson Ooms and Booth,
Attorneys.

Patented Mar. 13, 1945

2,371,228

UNITED STATES PATENT OFFICE 2,371,228

TORQUE TRANSMISSION

Adiel Y. Dodge, Rockford, Ill.

Application February 17, 1943, Serial No. 476,143

12 Claims. (Cl. 74—293)

This invention relates to torque transmissions and more particularly to devices for transmitting torque at a plurality of selected speed and torque ratios.

One of the objects of the invention is to provide a torque transmission including a differential gear unit which is so constructed and arranged as to function either as a reduction gear or as a clutch. In this construction, one element of the gear unit is held against reverse rotation to provide a fulcrum for torque multiplication and the gears are enclosed to form a fluid pump so that when flow of fluid through the gears is obstructed they will lock to transmit torque at a unitary ratio.

Another object of the invention is to provide torque transmission including a gear type fluid pump unit in which outlet pressure from the unit is imposed on its housing parts to force them into sealing engagement with the gears.

Still another object of the invention is to provide a torque transmission in which torque changes are produced hydraulically under the control of a simple unitary valve construction. According to one feature of the invention, the valve is formed by an elongated tube having ports communicating with the hydraulic units and which may effectively control a plurality of such units.

Still another object of the invention is to provide a torque transmission in which a plurality of torque ratios may be obtained through the use of one or more combined gear reduction and clutch units.

The above and other objects and advantages of the invention will be more readily apparent from the following description when read in connection with the accompanying drawings, in which—

Figure 1:
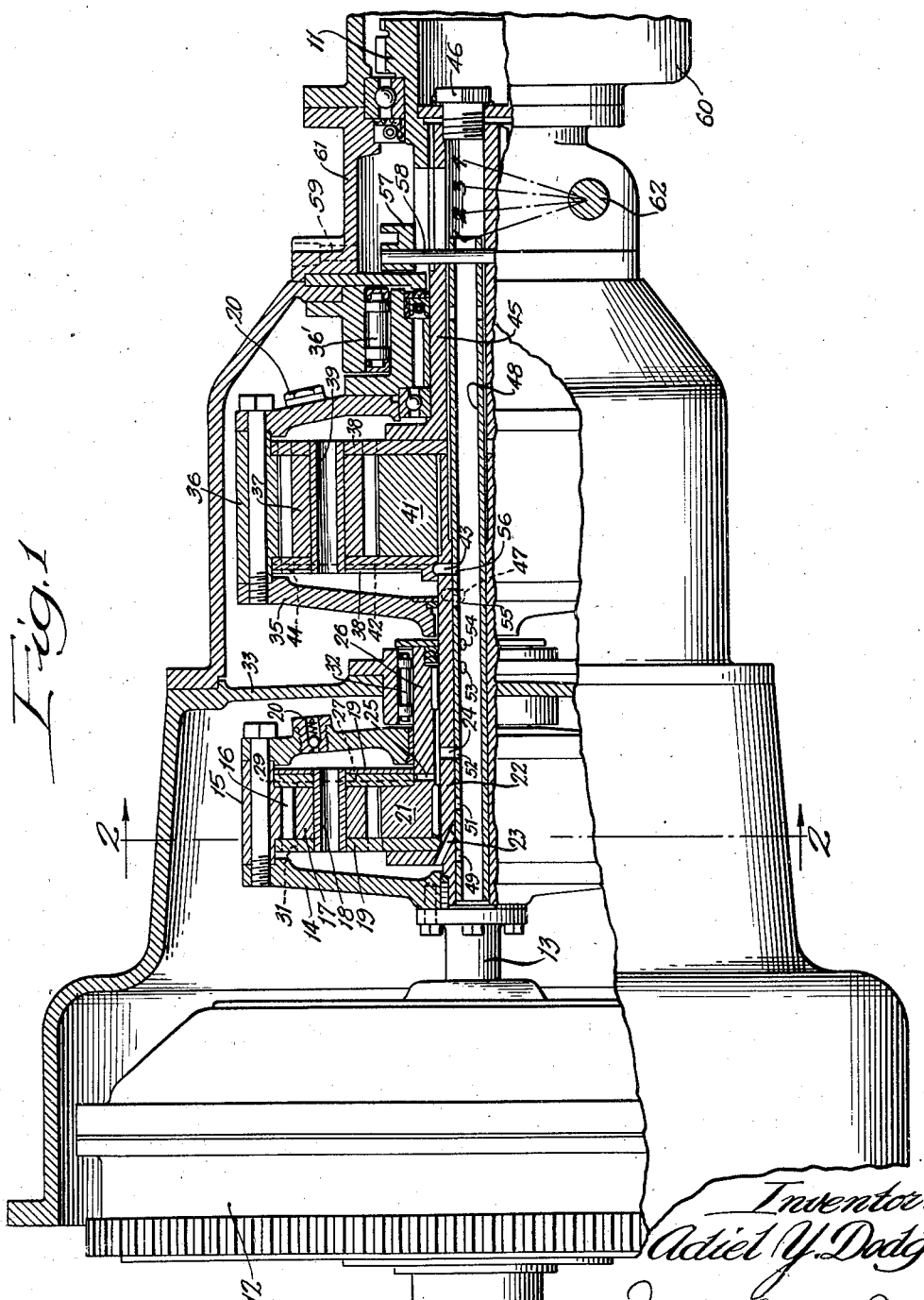
Figure 2:
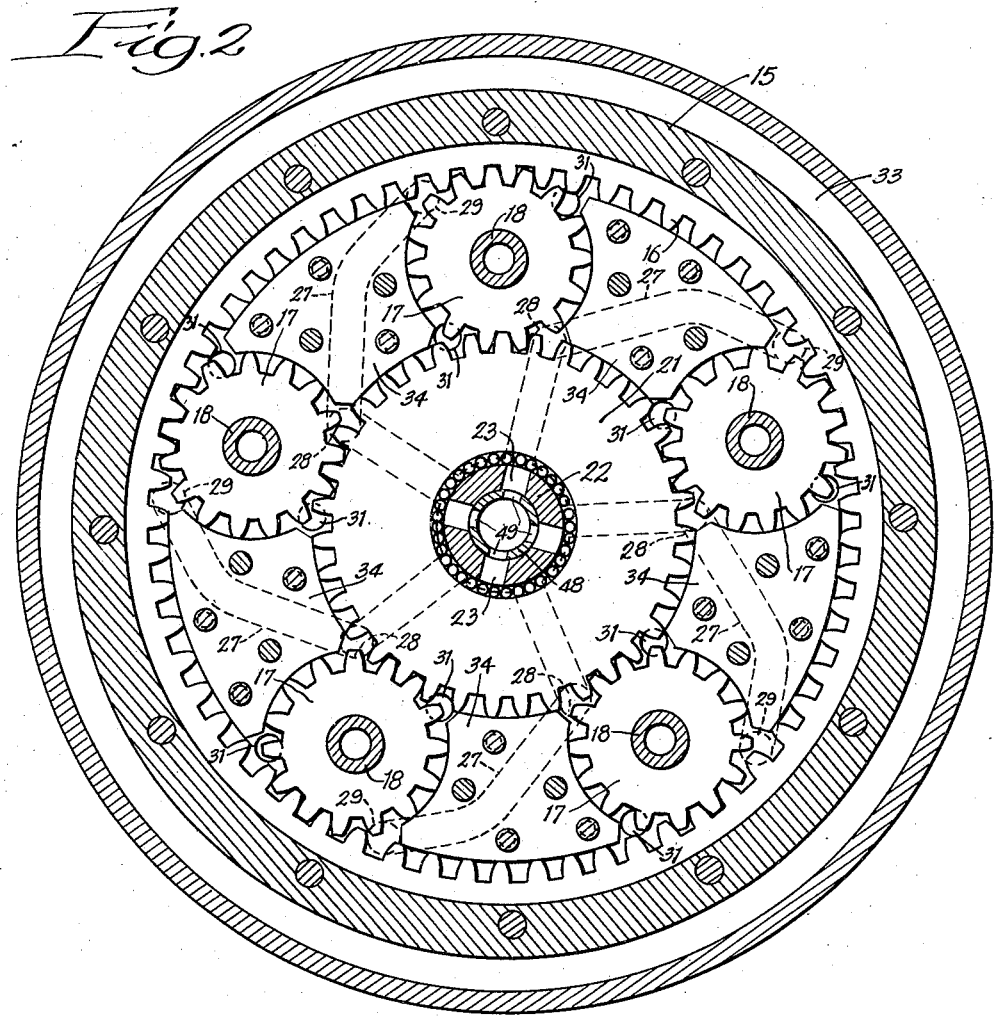

Figure 1 is a longitudinal section with parts in elevation of a transmission embodying the invention; and Figure 2 is a partial section on the line 2—2 of Figure 1.

The transmission illustrated is adapted to connect a driving shaft 10 which may be the crank shaft of an engine to a driven shaft 11 which may be connected to the driving wheels of a vehicle or to any other load to be driven. The driving shaft is connected to the driving member of a unit 12 which may be a conventional friction clutch, a fluid fly wheel, a hydraulic torque converter or a fluid displacement clutch of the type more particularly described and claimed in my copending application, Serial No. 420,479, filed on November 26, 1941. In any event, the unit 12 is of a type adapted to transmit torque under some conditions and to interrupt torque flow under other conditions. In the case of a fluid fly wheel or torque converter, it will be noted that torque flow is interrupted at low speeds when the velocity of fluid in the unit is insufficient to drive its driven member.

The driven member of the unit 12 is connected through a shaft 13 to a casing 14 forming the outer casing of a planetary differential gear set. The casing 14 comprises two side plates to which a ring 15 is connected in fluid tight relation, the ring having formed thereon internal gear teeth 16 so that it forms a ring gear for the gear set. The ring gear meshes with a series of planet pinions 17 supported on hollow spindles or arbors 18 extending between and through side plates 19 which form a planet carrier. The planet pinion 17 in turn meshes with a sun gear 21 to complete the differential gear set.

The side plates 19 forming the planet carrier are connected to a hollow shaft 22 which is formed with an exhaust port 23 communicating with the interior of the casing 14 and with an inlet port 24. The inlet port communicates through a passage 25 formed in a sleeve 26 which supports the sun gear 21 with inlet passages 27 in one of the side plates 19. As best seen in Figure 2, the inlet passages 27 communicate with the ends of the gear teeth to supply fluid thereto, each passage opening into the gear teeth at one point 28 where the planet pinions mesh with the sun gear and at another point 29 where the planet pinions mesh with the ring gear. The side plates are further formed with exhaust ports 31 communicating with the ends of the gear teeth at points across the intermeshing teeth from the points 28 and 29 through which fluid may be forced by the pump into the casing 14.

In order that the gear set may act as a reduction unit, the sleeve 26 connected to the sun gear is connected to a one-way brake 32 acting between the sleeve and a fixed housing part 33 to prevent rearward rotation of the sun gear. With this construction, when the ring gear is driven and the sun gear is held against reverse rotation, the planet cage will be turned forwardly at reduced speed and increased torque.

In operation of the gear set, when fluid is being pumped from the inlet into the casing 14 the fluid in the casing will act against the side-plates 19 substantially their entire area to urge them toward the ends of the gears. Since the area on the inside of the plates exposed to the corresponding high pressure is relatively small, the plates will be forced into sealing engagement with the gear teeth with a force proportional to the discharge pressure to assist in maintaining a seal between the gears and the side plates. The pressure on opposite sides of the gear set is equalized through the hollow arbors 18 which further enable the unit to function with only one discharge passage on one side of the gear set. In order that the gear set may function as a pump as described, the spaces between the gears are closed by blocks 34 as shown in Figure 2 which fit closely against the ends of the gear teeth.

In order to limit the pressure in the casing 14 as a safety measure and to absorb shock loads so that a smoother operating transmission is provided, a pressure relief valve 20 is connected to the casing. The valve 20 is preferably adjusted to open at a pressure somewhat greater than that developed at normal full torque operation so it will remain closed during normal operation. However, when the valve, as hereinafter described, is moved to close the exhaust port 23 a pressure higher than normal will be developed in the casing 14 due to inertia effects and this pressure will be relieved by the valve 20. Thus the load will be picked up smoothly without shock. The valve 20 also serves as a safety device to limit the fluid pressure in the casing 14 and to limit the torque which can be transmitted.

A second planetary gear unit similar to the first unit just described is provided in the transmission and comprises a casing 35 formed by side plates carrying a ring gear 36. The casing is held against reverse rotation by a one-way brake 36' acting between an extension thereof and a fixed housing part. The ring gear 36 meshes with a series of planet pinions 37 carried by side plates 38 forming a gear carrier and between which the pinions are supported on hollow arbors or spindles 39. The planet pinions 37 in turn, mesh with a sun gear 41 which is connected to the hollow shaft 22. One of the side plates 38 is formed with inlet passages 42 communicating with a port 43 in the shaft 22 and the side plates are further formed with discharge passages 44 to conduct fluid through the side plates into the space within housing 35. The carrier formed by side plates 38 is connected to the driven shaft 11 by a tubular extension 45 keyed to the shaft and closed by a plug 46.

The space within the housing 35 communicates through a discharge port 47 in the tubular shaft 22 with the interior of the shaft, the discharge port 47 being angularly displaced from the inlet port 43 to conserve space.

The several discharge and inlet ports are controlled by a unitary valve formed by an elongated tube or sleeve 48 slidable in the shaft 22 and in the tubular extension 45. The sleeve is formed with a port 49 adapted to register with the discharge port 23, ports 51 and 52 adapted to register with the inlet port 24, ports 53 and 54 adapted to register with the discharge port 47, and ports 55 and 56 adapted to register with the inlet port 43. The sleeve is controlled by a collar 57 connected to the sleeve by a pin 58 extending through elongated slots in the tubular extension 45 and is supplied with fluid from any suitable source, preferably under a low pressure through a passage 59 communicating with a housing part 61 which encloses the rear end of the extension 45 and the collar 57. The collar may be controlled by a yoke not shown, connected to a control shaft 62 through which the collar may be moved through any one of a plurality of control positions indicated by the dotted lines extending from the control shaft and numbered respectively 1, 2, 3 and 4. The sleeve 48 is formed to fit closely into the shaft 22 around the ports to control them but may fit loosely in the remainder of the shaft and the extension 45.

With the parts in shifted position 1, as shown, the discharge passage 23 is closed by the valve sleeve and the inlet passage 24 registers with the port 52. At the same time, the discharge passage 47 is closed and the inlet passage 43 communicates with the port 56. Thus in this position of the valve, the inlets of both differential gear units are open and the outlets of both units are closed. Thus the units will be filled with liquid and since their outlets are closed they will be locked to form in effect fluid clutches. In this position, when the unit 12 is in driving condition, torque will be transmitted from the driving shaft to the driven shaft at a one-to-one ratio.

When the collar 57 is shifted to position 2, the inlet port 24 of the first gear unit will be closed by the valve sleeve and its outlet port 23 will be open throughout port 49. The inlet port 43 of the second unit will still be open through the valve port 55 and its outlet port 47 will be closed by the valve sleeve. In this position, no fluid will be supplied to the first gear unit and any fluid therein will be freely discharged through its outlet so that the several elements of this unit may turn freely relative to each other. As the ring gear 16 is driven forward, it reacts through the planet pinion 17 and tends to turn the sun gear 21 backward. Since this is prevented by the one-way brake 32, the planet carrier will be turned forward and will drive the sun gear 41 of the second unit at reduced speed and increased torque. The second unit still functions as a closed clutch and transmits torque received from the first unit to the driven shaft at a unitary ratio so that the driving shaft will drive the driven shaft at a speed and torque determined by the gear ratio of the first unit.

When the collar 57 is shifted to position 3, the inlet port 24 of the first unit will be open through the valve port 51 and the discharge port 23 of this unit will be closed. The inlet port 43 of the second unit will be closed and the discharge port 47 of this unit will be open through the valve port 54. Thus, at this time the first unit operates as a closed clutch to transmit torque at a unitary ratio to the sun gear 41 of the second unit. This tends to turn the ring gear 36 backward which is prevented by the one-way brake 37 so that the planet carrier and the driven shaft will be turned forward at reduced speed and increased torque. Since the sun gear of the second unit forms its driving member whereas the ring gear of the first unit is its driving member, it will be noted that a different ratio will be provided in the two units so that the intermediate positions 2 and 3 as above described, provide a different overall ratio between the driving and driven shafts.

When the collar 57 is shifted to position 4, the outlet port 23 of the first unit will be open around the end of the valve sleeve and the inlet port 24 will be closed. Outlet port 47 of the second unit will be open through valve port 53 and the inlet port 43 will be closed. In this condition, both gear sets act as mechanical reduction units in series to provide a very high torque ratio between the driving and driven shafts. It will be understood that if a torque converter is used at 12, the ratios provided by the gearing in the several different positions will become in effect variable torque ranges within the limits of operation of the torque converter.

Reverse may be obtained by any desired type of reverse gear mounted in a housing 60 around the driven shaft 11, which housing may also inclose a power take-off mechanism or other desired power transmitting devices.

While one embodiment of the invention has been shown and described in detail, it will be understood that this is illustrative only and is not intended to be taken as a definition of the scope of the invention, reference being had for this purpose to the appended claims.

What is claimed is:

1. In a torque transmission, a torque transmitting unit comprising a planetary differential gear set, means inclosing the gears of said gear set whereby they form a fluid plump, a tubular shaft extending axially through the gear set and formed with fluid inlet and outlet passages communicating with the gear set, valve means in the shaft controlling the passages, the shaft being connected to one element of the gear set, a second shaft connected to another element of the gear set, and a one-way brake connected to a third element of the gear set.

2. In a torque transmission, a torque transmitting unit comprising a planetary differential gear set, means inclosing the gears of said gear set whereby they form a fluid plump, a tubular shaft extending axially through the gear set and formed with fluid inlet and outlet passages communicating with the gear set, a valve sleeve slidable axially in the shaft having ports therein movable into register with the inlet and outlet passages to control the pumping action of the gear set, the shaft being connected to one element of the gear set, a second shaft connected to another element of the gear set, and a one-way brake connected to a third element of the gear set.

3. In a torque transmission, a torque transmitting unit comprising a planetary gear set including a gear carrier, planet pinions on the gear carrier, and sun and ring gears meshing with the planet pinions, the gear carrier having side plates overlying and fitting against the ends of the pinions and gears, means between the side plates fitting against the ends of the gear teeth, one of the side plates being formed with inlet passages communicating with the gear teeth and there being outlet passages through the side plates communicating with the gear teeth, a housing inclosing the gear set into which fluid under pressure from the outlet passages discharges, the planet carrier having axially extending openings therethrough connecting the housing on opposite sides of the gear set to equalize the pressure therein.

4. In a torque transmission, a torque transmitting unit comprising a planetary gear set including a gear carrier, planet pinions on the gear carrier, and sun and ring gears meshing with the planet pinions, the gear carrier having side plates overlying and fitting against the ends of the pinions and gears, means between the side plates fitting against the ends of the gear teeth, one of the side plates being formed with inlet passages communicating with the gear teeth and there being outlet passages through the side plates communicating with the gear teeth, a housing inclosing the gear set into which fluid under pressure from the outlet passages discharges, driving and driven shafts connected to two elements of the gear set respectively, and a one-way brake connected to a third element of the gear set.

5. In a torque transmission, a gear unit comprising spaced parallel side plates, intermeshing gears between the plates with their ends engaging and sealing against the plates, blocking means between the plates inclosing the outer edges of the gear teeth to form a gear pump, one of the plates being formed with an inlet passage communicating with the gears and there being outlet passages through the plates communicating with the gears, and a casing inclosing the gear unit into which fluid under pressure from the outlet passages discharges so that fluid pressure in the casing will tend to hold the plates against the gears, at least one of the gears being supported between the plates on hollow mounting means extending through the plates to connect and equalize the pressure on opposite sides thereof.

6. A torque transmission comprising a pair of planetary differential gear units each having means inclosing its gears whereby they form a fluid pump and means forming inlet and outlet passages therefor, a driving shaft connected to one element of one gear unit, an intermediary shaft interconnecting a second element of said one unit and one element of the other unit, a driven shaft connected to a second element of said other unit, one-way brakes connected to third elements of each of said units, and valve means controlling the inlet and outlet passages to change the driving conditions of the units.

7. A torque transmission comprising a pair of planetary differential gear units each having means inclosing its gears whereby they form a fluid pump and means forming inlet and outlet passages therefor, a driving shaft connected to one element of one gear unit, an intermediary shaft interconnecting a second element of said one unit and one element of the other unit, a driven shaft connected to a second element of said other unit, one-way brakes connected to third elements of each of said units, and a single valve member movable to any one of a plurality of positions to control said passages.

8. A torque transmission comprising a pair of planetary differential gear units each having means inclosing its gears whereby they form a fluid pump and means forming inlet and outlet passages therefor, a driving shaft connected to one element of one gear unit, an intermediary shaft interconnecting a second element of said one unit and one element of the other unit, a driven shaft connected to a second element of said other unit, one-way brakes connected to third elements of each of said units, said intermediary shaft being hollow and having ports therein communicating with said passages respectively, and a valve member slidable axially in the intermediary shaft to control the ports.

9. A torque transmission comprising a pair of planetary differential gear units each having means inclosing its gears whereby they form a fluid pump and means forming inlet and outlet passages therefor, a driving shaft connected to one element of one gear unit, an intermediary shaft interconnecting a second element of said one unit and one element of the other unit, a driven shaft connected to a second element of said other unit, one-way brakes connected to third elements of each of said units, said intermediary shaft being hollow and having ports therein communicating with said passages respectively, a tubular valve sleeve slidable axially in the intermediary shaft and having ports therein cooperating with the ports in the shaft to control the passages, and means forming a connection from a supply of operating fluid into the valve sleeve.

10. A transmission for connecting a driving shaft to a driven shaft comprising a torque transmitting unit so constructed and arranged that it will transmit and interrupt torque flow, said unit having a driving member connected to the driving shaft and a driven member, a plurality of differential gear sets in series each having one element connected to the driven member of the preceding unit and another element connected to the driving member of the succeeding unit with said other element of the last gear set in the series connected to the driven shaft, a one-way brake connected to a third element of each gear set, means inclosing the gears of each gear set whereby it forms a fluid pump, and valve means for selectively controlling the flow of fluid through the gear sets whereby they may be caused to act as reduction units or as fluid clutches.

11. A transmission for connecting a driving shaft to a driven shaft comprising a torque transmitting unit so constructed and arranged that it will transmit and interrupt torque flow, said unit having a driving member connected to the driving shaft and a driven member, a pair of planetary gear sets each having a sun gear, a ring gear, a planet carrier, and pinions on the carrier meshing with the sun and ring gears, means cooperating with the carriers to inclose the gears of the gear sets to form fluid pumps, said driven member being connected to the ring gear of one gear set, a one-way brake holding the sun gear of said one gear set against reverse rotation, means connecting the carrier of said one gear set to the sun gear of the other gear set, means connecting the carrier of the other gear set to the driven shaft, a one-way brake holding the ring gear of the other gear set against reverse rotation, and valve means controlling the flow of fluid through the gear sets.

12. In a torque transmission, a torque transmitting unit comprising a planetary gear set including a gear carrier, planet pinions on the gear carrier, and sun and ring gears meshing with the planet pinions, the gear carrier having side plates overlying and fitting against the ends of the pinions and gears, means between the side plates fitting against the ends of the gear teeth, one of the side plates being formed with inlet passages communicating with the gear teeth and there being outlet passages thru the side plates communicating with the gear teeth, a housing enclosing the gear set into which fluid under pressure from the outlet passages discharges, the gear set and the housing being so constructed and arranged as to provide passages connecting the housing on opposite sides of the gear set to equalize the pressures therein.

ADIEL Y. DODGE.